May 26, 1953
L. C. PACKER ET AL
2,640,100
MEANS FOR TESTING ROTORS
Filed May 2, 1950
2 Sheets—Sheet 1
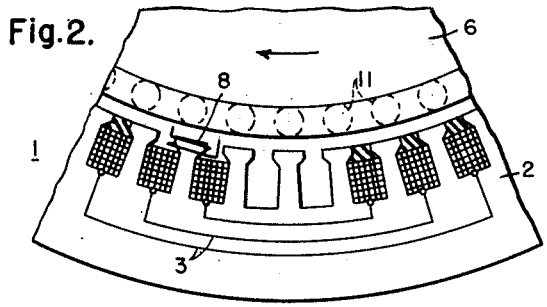
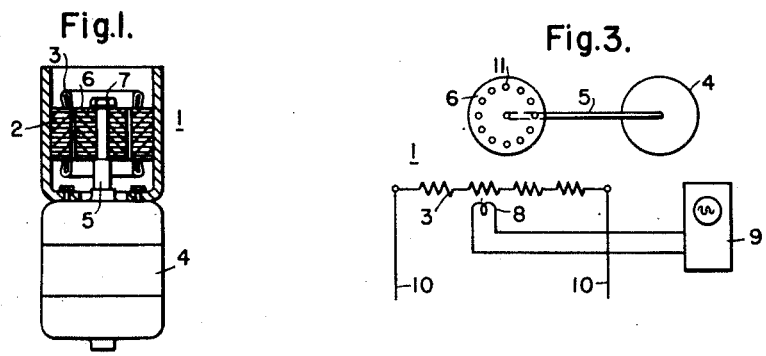
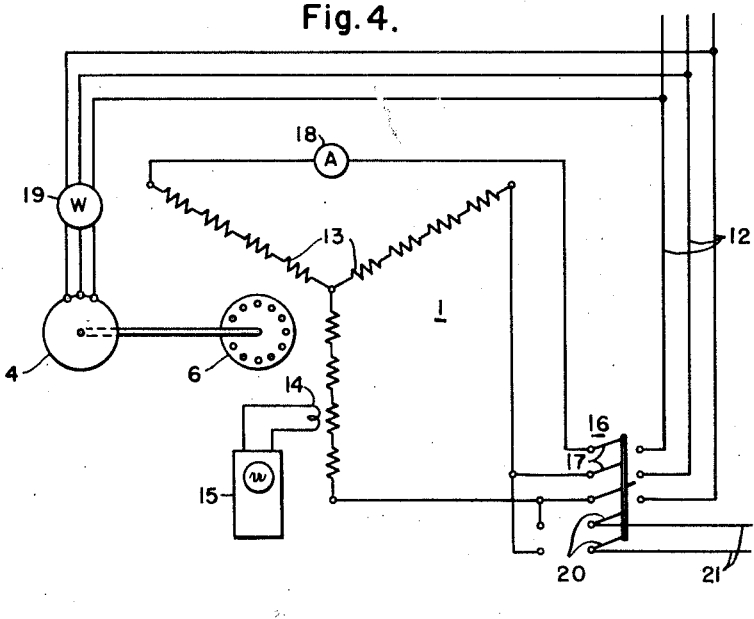
WITNESSES:
INVENTORS
Lewis C. Packer, Roy H. Cross
and George E. Monchamp.
BY
ATTORNEY Patented May 26, 1953

2,640,100

UNITED STATES PATENT OFFICE 2,640,100

MEANS FOR TESTING ROTORS

Lewis C. Packer, East Longmeadow, Roy H. Cross, Springfield, and George E. Monchamp, Holyoke, Mass., assignors to Westinghouse Electric Corporation, East Pittsburgh, Pa., a corporation of Pennsylvania Application May 2, 1950, Serial No. 159,536

6 Claims. (Cl. 175—183)

The present invention relates to a method and means for testing squirrel-cage rotors for electric motors, and more particularly to a rapid and accurate method and means for testing such rotors for broken or high-resistance bars or end rings.

In the manufacture of squirrel-cage rotors for electric motors, it is extremely desirable to test the finished rotors as a routine step in production, so as to be able to detect defective or unsatisfactory rotors before they are assembled into complete motors, thus avoiding the expense of assembling motors which will later have to be scrapped. This is especially important in the case of die-cast rotors, in which the cage winding is die-cast in place in the rotor slots. In such rotors, broken bars may occur because of trapped gases or shrinkage of the metal during cooling, and excessively high resistance of individual bars, or of the end rings, may sometimes be caused by blow holes or porosity in the cast metal. Such broken or high-resistance bars are detrimental to the performance of the rotor, and rotors with such bars must be detected and rejected before being assembled in complete motors.

It is also necessary to detect rotors having high stray load losses, which may occur in die-cast rotors due to eddy current losses in the bars and the core laminations, and hysteresis losses in the laminations. These stray load losses are affected by numerous factors which are difficult to control in production, and a rapid and inexpensive test is necessary to detect rotors with excessive stray load losses. Such a test is disclosed and claimed in a copending application of L. C. Packer et al., Serial No. 730,366, filed February 24, 1947, now Patent No. 2,568,406, issued September 18, 1951, and assigned to the Westinghouse Electric Corporation. In this test, the rotor to be tested is placed in a rotating magnetic field, which is preferably produced by a polyphase winding on a test stator, and the rotor is driven in the reverse direction, that is, the direction opposite to the direction of rotation of the magnetic field. The torque required to drive the rotor at a given speed is measured, and this torque is approximately proportional to the stray load loss. The resistance of the rotor can also be determined at the same time by measuring the current in the polyphase test stator winding, which is approximately inversely proportional to the rotor resistance. This test, however, only indicates the average resistance of the rotor, and does not reveal the presence of broken bars, or of individual bars of excessively high resistance, unless the number of such bars is large enough to materially affect the average resistance of the rotor. Individual broken or high-resistance bars, however, adversely affect the performance of the rotor, and broken bars cause noisy operation and greatly increase the difficulty of balancing the rotor. It is therefore important to be able to detect the presence of such bars before the rotor is assembled into a complete motor.

The principal object of the present invention is to provide a rapid and reliable method for detecting the presence of broken or high-resistance bars or end rings in squirrel-cage rotors.

Another object of the invention is to provide a method and means for testing squirrel-cage rotors for broken or high-resistance bars or end rings which provides a quick visual test that can readily be applied as a routine test to all rotors in production, and which can be performed even by relatively inexperienced operators.

A further object of the invention is to provide a method and means for testing squirrel-cage rotors for broken or high-resistance bars or end rings which can readily be combined with the reverse-rotation test for stray load losses disclosed in the above-mentioned copending application, so that the rotor can be given a complete test quickly and accurately.

More specifically, the present invention provides a method for detecting the presence of broken or high-resistance bars in squirrel-cage rotors in accordance with which the rotor to be tested is placed in a constant, unidirectional magnetic field adjacent an exploring coil, or pickup coil. When the rotor is rotated, an alternating voltage appears in the exploring coil, the number of cycles in one revolution of the motor corresponding to the number of bars. If all the bars of the rotor are of approximately equal resistance, as they should be, the amplitude of the voltage peaks will be substantially uniform. Broken or high-resistance bars, however, will produce voltage peaks of much greater amplitude, and thus can readily be detected by observing the wave shape of the voltage in the exploring coil by means of an oscilloscope. Broken end rings are also easily detected since they cause one or more high voltage peaks, depending on the number of rotor bars cut out of the circuit by the broken rings.

The invention will be more fully understood from the following detailed description, taken in connection with the accompanying drawings, in which:

Figure 1 is a view, partly in elevation, and partly in vertical section, of a suitable apparatus for carrying out the method;

Fig. 2 is a fragmentary view on an enlarged scale of a portion of a test stator and of a rotor being tested;

Fig. 3 is a schematic wiring diagram of a simple embodiment of the invention;

Fig. 4 is a schematic wiring diagram of a preferred arrangement for carrying out the method of the present invention in combination with the reverse-rotation test referred to above.

Figure 5:
Figs. 5, 6 and 7 are typical oscillograms showing results obtained in tests of rotors.

As indicated above, the new test method essentially comprises placing the rotor to be tested in a unidirectional magnetic field and observing the wave shape of the voltage generated in an exploring coil when the rotor is rotated. An apparatus for carrying out this method is shown in Figs. 1, 2 and 3. Fig. 1 shows a test stator 1 having a more or less conventional laminated stator core 2 supported in it. A suitable winding 3 is placed in the slots of the core 2. In the simple embodiment shown in Figs. 2 and 3, the winding 3 may be a conventional single-phase winding having concentric coils, as indicated in Fig. 2, so that a substantially constant, unidirectional magnetic field is provided in the test stator when the winding 3 is excited with direct current. A driving motor 4 is also provided which may be any suitable type of substantially constant-speed motor, either single-phase or three-phase, and the test stator 1 is preferably secured directly to one end of the driving motor 4, although it might be separately mounted, if desired. The shaft 5 of the motor 4 extends through the bore of the test stator 1 to receive a rotor 6 to be tested, and a nut 7, or other locking means, is provided for locking the rotor 6 on the shaft 5. In order to facilitate rapid operation, the motor 4 and test stator 1 are preferably disposed vertically, as shown in Fig. 1, so that the rotor 6 to be tested can easily be dropped in place on the shaft 5 and the nut 7 quickly tightened.

An exploring coil, or pickup coil, 8, is provided on the test stator adjacent the winding 3. As shown in Fig. 2, the exploring coil 8 may consist of several turns of wire wound around a tooth of the test stator core 2, and it is preferably disposed adjacent the center of a pole of the winding 3, but spaced from the center of the pole for a reason explained below. The winding 3 may be any type of single-phase winding and may have any number of poles and is shown in Fig. 3 as being a four-pole winding. The exploring coil 8 is connected to a cathode-ray oscilloscope 9 for observing the voltage generated in the coil.

It will be seen that when the winding 3 is excited from a direct-current line 10, as indicated in Fig. 3, a substantially constant, unidirectional magnetic field is produced in the test stator. If the rotor 6 to be tested is now rotated in this magnetic field, the teeth of the rotor will cause a pulsation of the flux due to the variation in reluctance caused by the moving rotor teeth. This pulsating flux generates voltages in the bars of the cage winding 11 of the rotor. These voltages cause currents to flow in the bars, and these currents, in turn, produce a magnetic flux opposing the air-gap flux of the winding 3. Thus, when the rotor is rotated, the air-gap flux, which links the exploring coil 8, pulsates, and an alternating voltage is generated in the coil 8 having one cycle for each rotor bar. If the rotor bars are all identical in resistance, the currents will be the same in all the bars, and the flux pulsations will be of equal magnitude, so that the amplitudes of all the voltage peaks in the coil 8 will be approximately equal. If a rotor bar is broken, however, or has abnormally high resistance, there will be no current, or a greatly reduced current, in that particular bar, so that as that bar passes the coil 8, the air-gap flux will not be reduced as much as by the other bars, and a much higher voltage peak will be generated in the coil 8. Thus, by observing the wave shape of the voltage generated in the coil 8, individual broken or high-resistance bars can readily be detected.

The maximum voltage in each rotor bar occurs as the bar passes the center of a pole of the winding 3. Since the bar has some inductance, however, the current in the bar lags the voltage and the maximum current occurs after the bar has passed the center of the pole. For this reason, it is preferred to displace the coil 8 from the center of the pole, as shown in Fig. 2, so that it is approximately in the position corresponding to maximum current in the rotor bars, thus increasing the sensitivity of the test.

Figure 6:
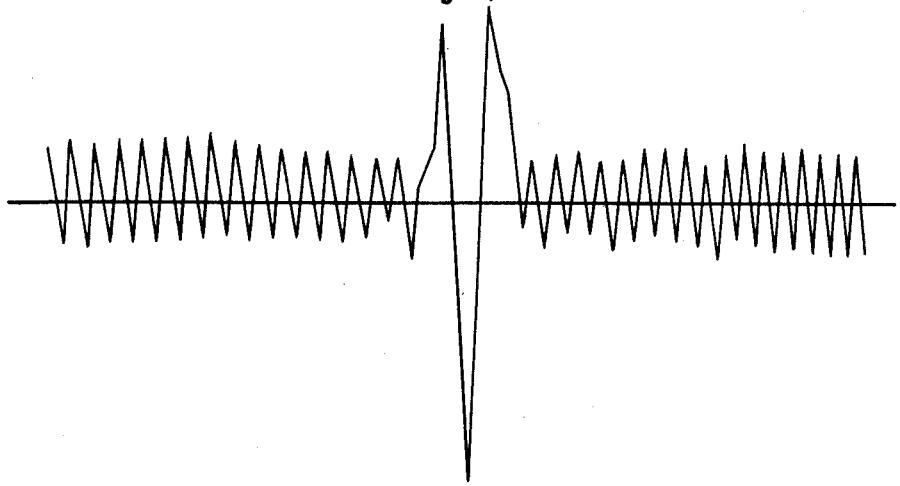
Figure 7:
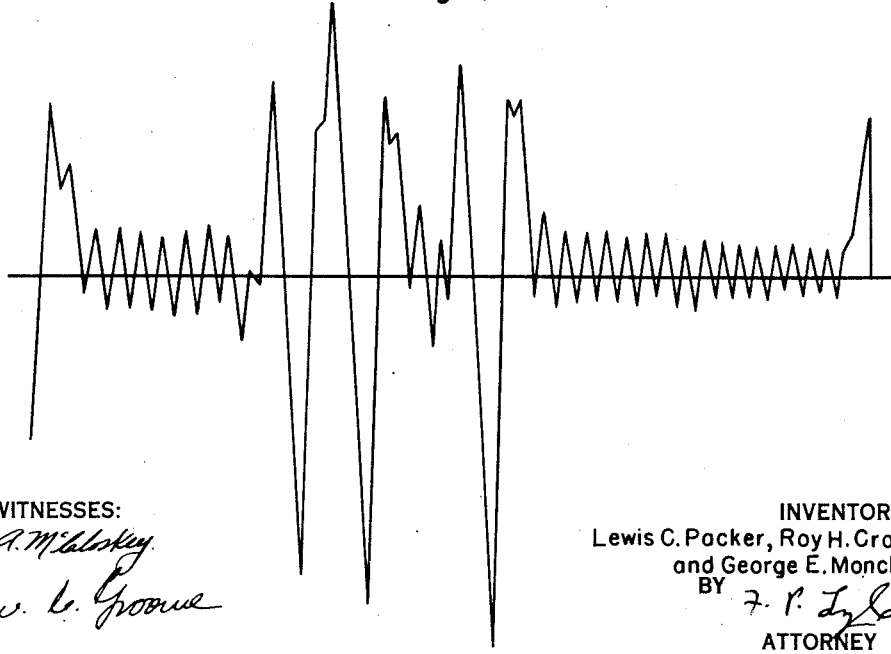

In order to observe the wave shape of the voltage in the coil 8, the oscilloscope 9 is connected to the coil, and the sweep circuit of the oscilloscope is adjusted so that the voltage peaks corresponding to all the rotor bars are simultaneously visible on the oscilloscope screen. Broken or high-resistance bars then stand out very clearly because of the much greater amplitude of the voltage peaks corresponding to these bars. Fig. 5 is an oscillogram of a typical voltage wave shape generated in the coil 8 by a good rotor, in which all the bars have approximately the same resistance, and it will be apparent that the amplitude of all the voltage peaks is approximately the same, the uniform variations being due to a slight eccentricity of the rotor. Fig. 6 is an oscillogram showing the voltage wave obtained with a rotor having one broken bar, while Fig. 7 shows the voltage wave obtained with a rotor having four broken bars. It will be obvious that the presence of these broken bars is clearly and unmistakably shown. Bars of excessively high resistance will show up in the same manner, except that the amplitude of the voltage peaks will be somewhat less but will still be much greater than those corresponding to the good bars. Broken end rings will produce a similar effect, the number of abnormally high voltage peaks depending on the number of bars cut out of the circuit by the defective end rings.

It will be apparent, therefore, that a simple and rapid test has been provided for detecting broken or high-resistance bars in squirrel-cage rotors. Thus, with the apparatus shown in Fig. 1, it is only necessary to place the rotor 6 to be tested on the shaft 5 of the motor 4, tighten the nut to lock the rotor on the shaft, and start the motor 4. The voltage wave appearing on the oscilloscope screen is observed to see if there are any abnormally high voltage peaks, and the motor is then stopped, the rotor 6 removed, and another rotor inserted. It will be seen that this test can be carried out very rapidly, so that it can be applied as a routine test to all rotors in production, and that it provides a highly accurate visual indication of the presence of broken or high-resistance bars, and can readily be carried out even by a relatively inexperienced operator.

As previously explained, it is highly desirable to test all rotors for high stray load losses, as well as for broken bars, and excessive stray load losses can readily be detected by the reverse-rotation test disclosed and claimed in the copending application mentioned above. The test method described herein for detecting broken bars can readily be combined with the reverse-rotation test to provide a rapid means for completely testing rotors in a relatively simple manner. Fig. 4 shows schematically the manner in which these two test methods may be combined in the same test apparatus. The physical construction of the test apparatus is the same as that of Fig. 1, with a test stator 1 and driving motor 4, which is shown in Fig. 4 as a three-phase motor supplied from a three-phase line 12. In this case, however, the test stator 1 is provided with a three-phase winding 13 of any suitable type, which is shown as being a four-pole winding, although any suitable number of poles may be utilized. An exploring coil 14 is placed on the test stator 1 adjacent the center of one pole of one phase of the winding, the coil 14 being preferably displaced somewhat from the center of the pole for the reasons explained above. The coil 14 may be similar to the coil 8 shown in Fig. 2 and is connected to an oscilloscope 15 in the same manner.

The winding 13 of the test stator 1 is connected to the three-phase line 12 by a switching means 16. The switching means 16 is shown diagrammatically as having three upper blades 17 for connecting the three terminals of the three-phase winding 13 to the line 12. It will be seen that when the blades 17 of the switch 16 are in their closed position, the winding 13 is excited with polyphase alternating current so that a rotating magnetic field is produced in the test stator 1. An ammeter 18 is provided for measuring the current in the winding 13. The driving motor 4 is connected to the line so that it drives the rotor 6 to be tested in the reverse direction, that is, the direction opposite to the direction of rotation of the rotating magnetic field, and a wattmeter 19 is provided to measure the power input to the driving motor 4.

The switching means 16 is also provided with two lower blades 20 for connecting a part of the winding 13 to a direct current line 21. As shown, the direct current line 21 is thus connected to two terminals of the winding 13 so that two phases of the winding in series are excited with direct current. If desired, however, one side of the line 21 might be connected to the neutral point of the winding 13 so as to excite only one phase. As shown diagrammatically, the switching means 16 is arranged so that when the blades 17 are closed to connect the alternating current line to the winding 13, the blades 20 are open, and when the blades 20 are closed to connect the direct current line to the winding 13, the blades 17 are open. It will be apparent that any suitable type of switching means might be used, properly interlocked to prevent simultaneous connection of the alternating current and direct current lines to the winding.

In carrying out a complete test with the apparatus of Fig. 4, the rotor 6 to be tested is placed in the test stator and the switch blades 17 are closed to connect the winding 13 to the alternating current line. The motor 4 is started to drive the rotor 6 in the reverse direction, preferably at a speed near synchronous speed, and the power input to the motor 4 and the current in the winding 13 are observed. As explained in the above-mentioned copending application, the torque required to drive the rotor in the reverse direction at any given speed is approximately proportional to the stray load losses of the rotor, and the wattmeter 19 is calibrated with the motor 4 to indicate the output torque of the motor directly. Thus, by observing the wattmeter reading, it is readily apparent whether the stray load loss of the rotor 6 is within the acceptable limit, and the ammeter reading indicates whether the average resistance of the rotor is within the desired range. After the stray load loss and average resistance have been determined in this way, the switching means 16 is moved to its other position, closing the blades 20 to excite the winding 13 with direct current to produce a constant, unidirectional magnetic field in the test stator. Since the rotor 6 is rotating in this field, a voltage is generated in the exploring coil 14 in the manner described above in connection with Figs. 2 and 3, and this voltage is observed on the screen of the oscilloscope 15. The presence of broken or high-resistance bars or end rings is clearly shown on the oscilloscope screen as described above, typical wave shapes being shown in Figs. 5, 6 and 7, previously discussed. The test is then complete, and the winding 13 may be deenergized, the motor 4 stopped, and the rotor 6 removed. It will be obvious that the order of the two tests may be reversed, and the test for broken bars carried out before the stray load loss test.

It will be seen that this test can be carried out very rapidly since it is only necessary, after starting the motor 4, to observe the wattmeter and ammeter readings, throw the switch 16 to its other position, and observe the wave shape on the oscilloscope screen. This can be done very quickly, and thus a large number of rotors can be tested in a relatively short time, making it possible to give this complete test to all rotors as a routine step in production. In this way, defective or inferior rotors can be detected before the expense of assembling them into complete motors is incurred.

It should now be apparent that a method and means have been provided for testing squirrel-cage rotors for broken or high-resistance bars or end rings which makes possible a rapid and very sensitive test, and which can be readily combined with a reverse-rotation test for high stray load loss. It will be obvious that although certain specific embodiments of the invention have been shown for the purpose of illustration, various modifications and other embodiments are possible. Thus, the method may be used alone, as well as in combination with the reverse rotation test, and when used alone, any suitable means for producing a unidirectional magnetic field may be utilized. When used in combination with the reverse rotation test, any suitable switching means may be used, and any number of phases of the three-phase winding may be excited with direct current, although the greatest sensitivity is probably obtained by exciting only one or two phases of the winding. It is to be understood, therefore, that the invention is not limited to the particular specific arrangements shown for the purpose of illustration, but in its broadest aspects, it includes all equivalent embodiments and modifications which come within the scope of the appended claims.

We claim as our invention:
1. Means for testing squirrel-cage rotors for broken or high-resistance bars or end rings, said testing means comprising a test stator having an exciting winding thereon, an exploring coil on the test stator adjacent said winding, means for exciting the exciting winding with direct current to produce a unidirectional magnetic field in the test stator, means for supporting a rotor to be tested in the test stator and for rotating the rotor, and means for observing the wave shape of the voltage generated in said exploring coil.

2. Means for testing squirrel-cage rotors for broken or high-resistance bars or end rings, said testing means comprising a test stator having a multipolar exciting winding thereon, an exploring coil on the test stator adjacent the center of one pole of the winding, means for exciting the exciting winding with direct current to produce a unidirectional magnetic field in the test stator, means for supporting a rotor to be tested in the test stator and for rotating the rotor, and means for observing the wave shape of the voltage generated in said exploring coil.

3. Means for testing squirrel-cage rotors for broken or high-resistance bars or end rings, said testing means comprising a test stator having a slotted core, a multipolar exciting winding disposed in the slots of the test stator, an exploring coil disposed in adjacent slots of the test stator near the center of one pole of the winding, means for exciting the exciting winding with direct current to produce a unidirectional magnetic field in the test stator, means for supporting a rotor to be tested in the test stator and for rotating the rotor, and an oscilloscope connected to observe the wave shape of the voltage generated in said exploring coil.

4. Means for testing squirrel-cage rotors comprising a test stator having a polyphase winding thereon, an exploring coil on the test stator adjacent said winding, means for exciting said winding with alternating current to produce a rotating magnetic field in the test stator, means for supporting a rotor to be tested in the test stator and for driving the rotor in the direction opposite to the direction of rotation of the magnetic field, means for measuring the torque required to drive the rotor, means for exciting at least a part of the test stator winding with direct current to produce a unidirectional magnetic field in the test stator, and means for observing the wave shape of the voltage generated in said exploring coil.

5. Means for testing squirrel-cage rotors comprising a test stator having a polyphase, multipolar winding thereon, an exploring coil on the test stator adjacent the center of one pole of said winding, means for exciting said winding with alternating current to produce a rotating magnetic field in the test stator, means for supporting a rotor to be tested in the test stator and for driving the rotor in the direction opposite to the direction of rotation of the magnetic field, means for measuring the torque required to drive the rotor, means for exciting at least a part of the test stator winding with direct current to produce a unidirectional magnetic field in the test stator, and means for observing the wave shape of the voltage generated in said exploring coil.

6. Means for testing squirrel-cage rotors comprising a test stator having a polyphase winding thereon, an exploring coil on the test stator adjacent the center of a pole of said winding, switching means for at times connecting said winding to a source of polyphase alternating current to produce a rotating magnetic field in the test stator and for at other times connecting at least a part of the winding to a source of direct current to produce a unidirectional magnetic field in the test stator, means for supporting a rotor to be tested in the test stator and for rotating the rotor in the direction opposite to the direction of rotation of the rotating magnetic field, means for measuring the torque required to drive the rotor and the current in the test stator winding, and means for observing the wave shape of the voltage generated in said exploring coil.

LEWIS C. PACKER.
ROY H. CROSS.
GEORGE E. MONCHAMP.

References Cited in the file of this patent

UNITED STATES PATENTS

| Number | Name | Date |
| --- | --- | --- |
| 1,685,965 | Spooner | Oct. 2, 1928 |
| 2,150,922 | Hay | Mar. 21, 1939 |
| 2,308,159 | Drummond | Jan. 12, 1943 |
| 2,427,672 | Haydock | Sept. 23, 1947 |
| 2,519,367 | Gunn | Aug. 22, 1950 |
| 2,568,406 | Packer | Sept. 18, 1951 |